(12) United States Patent
Wang et al.

(10) Patent No.: US 12,114,195 B2
(45) Date of Patent: Oct. 8, 2024

(54) COMMUNICATIONS METHOD AND APPARATUS (71) Applicant: Huawei Technologies Co., Ltd., Shenzhen (CN)

(72) Inventors: Xuesong Wang, Beijing (CN); Jing Han, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 548 days.

(21) Appl. No.: 17/226,981

(22) Filed: Apr. 9, 2021

(65) Prior Publication Data
US 2021/0227419 A1 Jul. 22, 2021

Related U.S. Application Data (63) Continuation of application No. PCT/CN2019/115167, filed on Nov. 1, 2019.

(30) Foreign Application Priority Data

Nov. 2, 2018 (CN) .......................... 201811303675.8

(51) Int. Cl.
*H04W 24/10* (2009.01)
*H04W 8/24* (2009.01)
*H04W 56/00* (2009.01)
*H04W 72/04* (2023.01)
*H04W 72/0453* (2023.01)

(52) U.S. Cl.
CPC ............ *H04W 24/10* (2013.01); *H04W 8/24* (2013.01); *H04W 56/001* (2013.01); *H04W 72/0453* (2013.01)

(58) Field of Classification Search
None
See application file for complete search history.

(56) References Cited

U.S. PATENT DOCUMENTS

2013/0208601 A1* 8/2013 Cui ....................... H04W 24/10
   370/252
2014/0341192 A1 11/2014 Venkob et al.
2019/0053235 A1* 2/2019 Novlan ............... H04L 43/0876
(Continued)

FOREIGN PATENT DOCUMENTS

CN    106797536 A     5/2017
WO    2014098507 A1   6/2014

OTHER PUBLICATIONS

Ericsson, "Measurements with multiple SCells", 3GPP TSG-RAN WG4 Meeting #AH1807, R4-1808710, Jul. 2-6, 2018, 3 pages.
(Continued)

*Primary Examiner* — Hong Shao
(74) *Attorney, Agent, or Firm* — Slater Matsil, LLP (57) ABSTRACT A communications method and apparatus are provided. The terminal device performs measurement on a first secondary component carrier (SCC), wherein the terminal device is capable of measuring, on the first SCC, at least six cells and 24 synchronization signal blocks (SSBs), the 24 SSBs have different physical cell identifiers and/or time indexes, the physical cell identifiers are used to identify different physical cells, and the time indexes are used to identify different SSBs; wherein the first SCC is configured to report an SSB-based measurement result.

14 Claims, 8 Drawing Sheets (56) References Cited

U.S. PATENT DOCUMENTS

2020/0059810 A1* 2/2020 Harada ................ H04W 48/10
2021/0328642 A1* 10/2021 Dalsgaard ............ H04B 7/0617

OTHER PUBLICATIONS

3GPP TS 38.133 V15.3.0 (Sep. 2018), 3rd Generation Partnership Project, Technical Specification Group Radio Access Network, NR, Requirements for support of radio resource management (Release 15), 136 pages.

MediaTek Inc., "Remaining issues for UE measurement capability", 3GPP TSG-RAN WG4 Meeting #AH1807, R4-1808844, Jul. 2-6, 2018, 3 pages, Montreal, Canada.

Ericsson, "Measurement capability for SSB based measurements", 3GPP TSG-RAN WG4 Meeting #88, R4-1810982, Aug. 20-24, 2018, 2 pages, Gothenborg, Sweden.

3GPP TS 38.331 V15.3.0 (Sep. 2018), 3rd Generation Partnership Project, Technical Specification Group Radio Access Network, NR, Radio Resource Control (RRC) protocol specification (Release 15), Total 445 pages.

Samsung, "Remaining Issues for UE Measurement Capability", 3GPP TSG-RAN WG4 Meeting #88, R4-1809938, Aug. 20-24, 2018, 3 pages, Gothenburg, Sweden.

3GPP TS 38.321 V15.3.0 (Sep. 2018), 3rd Generation Partnership Project, Technical Specification Group Radio Access Network, NR, Medium Access Control (MAC) protocol specification (Release 15), 76 pages.

Rapporteur (Ericsson), "Corrections on EN-DC", 3GPP TSG-RAN WG2 Meeting #101, NR_newRAT-Core, Feb. 26-Mar. 2, 2018, 50 Pages, Athens, Greece.

ZTE Corporation et al., "[Z752, Z753] Further Clarification on blackCellList and whiteCellList", 3GPP TSG-RAN WG2 Meeting #103, R2-1811594, Aug. 20-24, 2018, 3 Pages, Gothenburg, Sweden.

ZTE, "On UE measurement capability requirements", 3GPP TSG-RAN WG4 Meeting #88, R4-1811369, Aug. 20-24, 2018, 2 Pages, Gothenburg, Sweden.

* cited by examiner

COMMUNICATIONS METHOD AND APPARATUS

CROSS-REFERENCE TO RELATED APPLICATIONS

This application is a continuation of International Application No. PCT/CN2019/115167, filed on Nov. 1, 2019, which claims priority to Chinese Patent Application No. 201811303675.8, filed on Nov. 2, 2018. The disclosures of the aforementioned applications are hereby incorporated by reference in their entireties.

TECHNICAL FIELD

This application relates to the field of communications technologies, and in particular, to a communications method and apparatus.

BACKGROUND

In a wireless communications system, a terminal device needs to keep monitoring cells. A component carrier may be divided into a full-capability component carrier and a non-full-capability component carrier based on different manners of monitoring the cell by the terminal device. For a component carrier, how to determine a full-capability component carrier and a non-full-capability component carrier is currently popular research.

SUMMARY

This application provides a communications method and apparatus, to provide a manner of determining a full-capability component carrier or a non-full-capability component carrier.

According to a first aspect, this application provides a communications method. The communications method may be applied to a terminal device, and may include: determining, by the terminal device, a first measurement object corresponding to a secondary component carrier; and when there is an association relationship between the first measurement object and a first reporting configuration, and a reporting type of the first reporting configuration is a first type, determining, by the terminal device, that the secondary component carrier is a full-capability component carrier; or when there is an association relationship between the first measurement object and a first reporting configuration, and a reporting type of the first reporting configuration is a second type, determining, by the terminal device, that the secondary component carrier is a non-full-capability component carrier. The first type is different from the second type.

In this embodiment of this application, the full-capability component carrier or the non-full-capability component carrier may be determined based on a type of a reporting configuration associated with the first measurement object corresponding to the secondary component carrier, to resolve a problem, which is not resolved by current version of 38.133 specification, how to determine a full-capability component carrier within frequency range 2. In addition, in this embodiment of this application, no additional signaling overheads are required.

In a possible implementation, the method further includes: receiving, by the terminal device, first configuration information sent by a network device, where the first configuration information is used to configure one measurement object for each of N secondary component carriers on which measurement needs to be performed by the terminal device, and N is a positive integer greater than or equal to 1; receiving, by the terminal device, second configuration information sent by the network device, where the second configuration information is used to configure M reporting configurations for the terminal device, and M is a positive integer greater than or equal to 1; and receiving, by the terminal device, third configuration information sent by the network device, where the third configuration information is at least used to establish an association relationship between the first measurement object and the first reporting configuration, the first measurement object is one of the N measurement objects, and the first reporting configuration is one of the M reporting configurations; and in the association relationship, in a frequency band belongs to frequency range 2, only one measurement object is associated with the reporting configuration whose reporting type is the first type.

For example, if the network device expects to set a first secondary component carrier as the full-capability component carrier, the network device may associate, in a configuration of the frequency band belongs to frequency range 2, the first measurement object corresponding to the first secondary component carrier with the reporting configuration of the first type; and in the frequency band belongs to frequency range 2, set only the first measurement object to be associated with the reporting configuration of the first type. After receiving the configuration, the terminal device may implicitly determine that the first secondary component carrier is a full-capability component carrier. Both the network device and the terminal device are clear to the setting of the full-capability component carrier, and the network device can better schedule and manage the terminal device.

According to a second aspect, this application further provides a communications method. The communications method may be applied to a terminal device, and includes: determining, by the terminal device, a first measurement object corresponding to a secondary component carrier; and when there is no association relationship between the first measurement object and a first reporting configuration, determining, by the terminal device, that the secondary component carrier is a non-full-capacity component carrier.

In a possible implementation, the method further includes: receiving, by the terminal device, first configuration information sent by a network device, where the first configuration information is used to configure one measurement object for each of N secondary component carriers on which measurement needs to be performed by the terminal device, and N is a positive integer greater than or equal to 1; receiving, by the terminal device, second configuration information sent by the network device, where the second configuration information is used to configure M reporting configurations for the terminal device, and M is a positive integer greater than or equal to 1; and receiving, by the terminal device, third configuration information sent by the network device, where the third configuration information does not establish an association relationship between the first measurement object and any one of the M reporting configurations, and the first measurement object is one of the N measurement objects.

According to a third aspect, this application further provides a communications method. The communications method may be applied to a terminal device, and includes: determining, by the terminal device, N measurement objects corresponding to N secondary component carriers on which measurement needs to be performed, where the N secondary component carriers one-to-one correspond to the N measurement objects, and N is a positive integer greater than 1; determining, by the terminal device from the N measurement objects in a frequency band belongs to frequency range 2, at least two measurement objects that have an association relationship with reporting configurations and for which a reporting type of the reporting configuration is a first type; determining, by the terminal device, a first measurement object from the at least two measurement objects; and using, by the terminal device, a secondary component carrier corresponding to the first measurement object as a full-capacity component carrier.

For example, if the network device expects to set a first secondary component carrier as the full-capability component carrier, the network device may associate, in a configuration of the frequency band belongs to the frequency range 2, the first measurement object corresponding to the first secondary component carrier with the reporting configuration of the first type; and in the frequency band belongs to the frequency range 2, set only the first measurement object to be associated with the reporting configuration of the first type. After receiving the configuration, the terminal device may implicitly determine that the first secondary component carrier is the full-capability component carrier. Both the network device and the terminal device are clear to the setting of the full-capability component carrier, and the network device can better schedule and manage the terminal device.

In this embodiment of this application, if the network device may indicate a range of a full-capability component carrier to the terminal device, the terminal device may select by itself, within the range, a component carrier as the full-capability component carrier. That the full-capability component carrier may be freely selected on a terminal device side is better compatible with the existing specification.

In a possible implementation, the method further includes: receiving, by the terminal device, first configuration information sent by a network device, where the first configuration information is used to configure one measurement object for each of N secondary component carriers on which measurement needs to be performed by the terminal device, and N is a positive integer greater than 1; receiving, by the terminal device, second configuration information sent by the network device, where the second configuration information is used to configure M reporting configurations for the terminal device, and M is a positive integer greater than or equal to 1; and receiving, by the terminal device, third configuration information sent by the network device, where the third configuration information is used to establish an association relationship between the at least two measurement objects in the frequency band belongs to frequency range 2 and the reporting configuration(s) whose reporting type is the first type, and the at least two measurement objects are included in the N measurement objects.

According to a fourth aspect, this application further provides a communications method. The communications method can be applied to a network device, and includes: sending, by the network device, first configuration information to a terminal device, where the first configuration information is used to configure one measurement object for each of N secondary component carriers on which measurement needs to be performed by the terminal device, and N is a positive integer greater than or equal to 1; sending, by the network device, second configuration information to the terminal device, where the second configuration information is used to configure M reporting configurations for the terminal device, and M is a positive integer greater than or equal to 1; and sending, by the network device, third configuration information to the terminal device, where the third configuration information is used to establish an association relationship between a first measurement object and a first reporting configuration, the first measurement object is any one of the N measurement objects, and the first reporting configuration is any one of the M reporting configurations; and in the association relationship, in a frequency band belongs to frequency range 2, only one measurement object is associated with the reporting configuration whose reporting type is a first type, or at least two measurement objects are associated with the reporting configuration(s) whose reporting type is a first type.

According to a fifth aspect, this application provides a communications apparatus. The communications apparatus is applied to a terminal device or a chip of a terminal device, and includes units or means configured to perform the steps in the first aspect, the second aspect, or the third aspect.

According to a sixth aspect, this application provides a communications apparatus. The communications apparatus is applied to a network device or a chip of a network device, and includes units or means configured to perform the steps in the fourth aspect.

According to a seventh aspect, this application provides a communications apparatus. The communications apparatus is applied to a terminal device or a chip of a terminal device, and includes at least one processing element and at least one storage element. The at least one storage element is configured to store a program and data, and the at least one processing element is configured to perform the method provided in the first aspect, the second aspect, or the third aspect of this application.

According to an eighth aspect, this application provides a communications apparatus. The communications apparatus is applied to a network device or a chip of a network device, and includes at least one processing element and at least one storage element. The at least one storage element is configured to store a program and data, and the at least one processing element is configured to perform the method provided in the fourth aspect.

According to a ninth aspect, this application provides a communications apparatus. The communications apparatus is applied to a terminal device, and includes at least one processing element (or chip) configured to perform the method in the first aspect, the second aspect, or the third aspect.

According to a tenth aspect, this application provides a communications apparatus. The communications apparatus is applied to a network device, and includes at least one processing element (or chip) configured to perform the method in the fourth aspect.

According to an eleventh aspect, this application provides a computer program product. The computer program product includes a computer instruction, and when the computer instruction is executed by a computer, the computer is enabled to perform the method in any one of the foregoing aspects.

According to a twelfth aspect, this application provides a computer-readable storage medium. The storage medium stores a computer instruction, and when the computer instruction is executed by a computer, the computer is enabled to perform the method in any one of the foregoing aspects.

DETAILED DESCRIPTION OF ILLUSTRATIVE EMBODIMENTS

For ease of understanding, descriptions of concepts related to this application are provided for reference by using examples. Details are as follows:

(1) Network device: is an entity for transmitting or receiving a signal on a network side, for example, a generation Node B (gNodeB). The network device may be a device configured to communicate with a mobile device. The network device may be an AP in a wireless local area network (WLAN), a base transceiver station (BTS) in a global system for mobile communications (GSM) or code division multiple access (CDMA), a base station (NodeB, NB) in wideband code division multiple access (WCDMA), an evolved NodeB (evolved Node B, eNB or eNodeB) in long term evolution (LTE), a relay station or an access point, a vehicle-mounted device, a wearable device, a network device in a future 5G network, a network device in a future evolved public land mobile network (PLMN), a gNodeB in an NR system, or the like. In addition, in the embodiments of this application, the network device provides a service for a cell, and a terminal device communicates with the network device by using a transmission resource (for example, a frequency domain resource, that is, a spectrum resource) used by the cell. The cell may be a cell corresponding to the network device (for example, a base station). The cell may belong to a macro base station, or may belong to a base station corresponding to a small cell. The small cell herein may include a metro cell (Metro cell), a micro cell (Micro cell), a pico cell (Pico cell), a femto cell (Femto cell), and the like. These small cells have characteristics of small coverage areas and low transmit power, and are applicable to providing a high-rate data transmission service. In addition, in another possible case, the network device may be another apparatus that provides a wireless communication function for the terminal device. A specific technology and a specific device form that are used by the network device are not limited in the embodiments of this application. For ease of description, in the embodiments of this application, an apparatus that provides a wireless communication function for a terminal device is referred to as a network device. In addition, in a network structure, the network device may include a centralized unit (CU) node and a distributed unit (DU) node. In this structure, a protocol layer of an eNB in a long term evolution (LTE) system is split, where some functions of the protocol layer are controlled by a CU in a centralized manner, some or all of remaining functions of the protocol layer are distributed in DUs, and the CU controls the DUs in a centralized manner.

The network device and the terminal device may be deployed on land, including an indoor or outdoor device, a handheld device, or a vehicle-mounted device; may be deployed on a water surface; or may be deployed on an aircraft, a balloon, or a satellite in the air. Application scenarios of the network device and the terminal device are not limited in the embodiments of this application.

Communication between the network device and the terminal device and communication between terminal devices may be performed by using a licensed spectrum, an unlicensed spectrum, or both a licensed spectrum and an unlicensed spectrum. A spectrum resource used between the network device and the terminal device is not limited in the embodiments of this application.

(2) Terminal device: may be a wireless terminal device that can receive scheduling and indication information of a network device. The wireless terminal device may be a device that provides a user with voice and/or data connectivity, a handheld device with a wireless connection function, or another processing device connected to a wireless modem. The wireless terminal device may communicate with one or more core networks or the internet through a radio access network (RAN). The wireless terminal device may be a mobile terminal device, such as a mobile phone (or referred to as a "cellular" phone or a mobile phone), a computer, or a data card, for example, may be a portable, pocket-sized, handheld, computer built-in, or vehicle-mounted mobile apparatus that exchanges language and/or data with the radio access network. For example, the terminal device may be a personal communication service (PCS) phone, a cordless phone, a session initiation protocol (SIP) phone, a wireless local loop (WLL) station, a personal digital assistant (PDA), a tablet computer (Pad), a computer with wireless sending and receiving functions, or the like. The wireless terminal device may also be referred to as a system, a subscriber unit, a subscriber station, a mobile station (mobile station, MS), a remote station, an access point (AP), a remote terminal, an access terminal, a user terminal, a user agent, a subscriber station (SS), a customer premises equipment (CPE), a terminal, user equipment (UE), a mobile terminal (MT), or the like. Alternatively, the wireless terminal device may be a wearable device, or a terminal device in a next-generation communications system, for example, a terminal device in a 5G network, a terminal device in a future evolved public land mobile network (PLMN), or a terminal device in an NR communications system.

(3) Communications system: may use various radio access technologies (RAT), for example, code division multiple access (CDMA), time division multiple access (TDMA), frequency division multiple access (FDMA), orthogonal frequency division multiple access (OFDMA), and single carrier frequency division multiple access (single carrier FDMA, SC-FDMA). A RAT used in the communications system is not limited in this application. The terms "system" and "network" may be interchangeable in this application. Networks may be classified into a 2G (generation) network, a 3G network, a 4G network, or a future evolved network such as a 5G network based on factors such as capacities, rates, or latencies of different networks. A typical 2G network includes a global system for mobile communications (global system for mobile communications/general packet radio service, GSM) network or a general packet radio service (GPRS) network. A typical 3G network includes a universal mobile communications system (UMTS) network. A typical 4G network includes a long term evolution (LTE) network. A typical 5G network includes a new radio access technique (NR) network. The UMTS network sometimes may also be referred to as a universal terrestrial radio access network (UTRAN), and the LTE network sometimes may also be referred to as an evolved universal terrestrial radio access network (E-UTRAN).

(4) Full-capacity component carrier (CC): The terminal device needs to monitor, on the CC, at least six cells and 24 synchronization signal blocks (SSB), where the 24 SSBs may have different physical cell identifiers (PCI) and/or time indexes, the PCIs are used to identify different physical cells, and the time indexes are used to identify different SSBs.

(5) Non-full-capability CC: The terminal device needs to monitor, on the CC, only at least two SSBs with different SSB time indexes in a serving cell.

(6) Measurement object (MO): includes various configurations related to a reference signal used for measurement, for example, a time-frequency location and a subcarrier spacing indication of the reference signal.

(7) Reporting configuration (RC): includes a specific parameter used by the terminal device to perform measurement. For example, the RC may include a reporting criterion, a type of a reference signal used for measurement, a reporting format, a measurement quantity type, a quantity of reported cell-level measurement quantities, and a quantity of reported beam-level (beam) measurement quantities. The reporting criterion may be specifically event-based triggering or periodic triggering, the type of the reference signal used for the measurement may be specifically an SSB or a channel state information reference signal (CSI-RS), and the reporting format may specifically report only a cell-level measurement quantity, report only a beam-level measurement quantity, or report both a cell-level measurement quantity and a beam-level measurement quantity.

Figure 1:
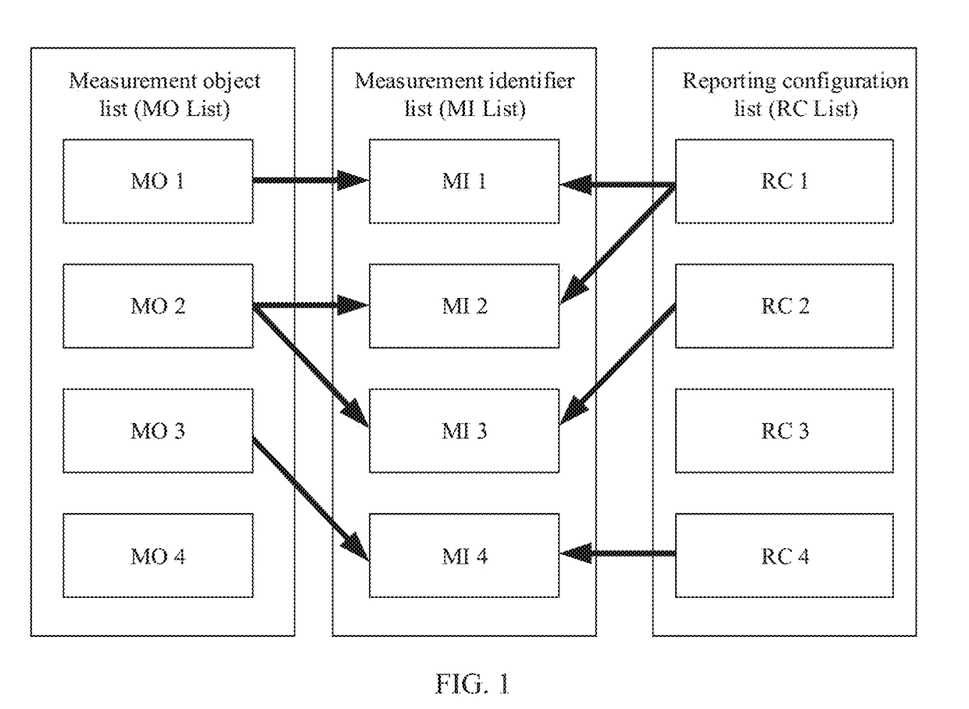
FIG. 1 is a schematic diagram of association between a measurement object and a reporting configuration according to an embodiment of this application.

(8) Measurement identifier (measure ID, MI): A measurement object is associated with a reporting configuration by using the measurement identifier. The measurement object may notify a terminal device of a configuration for measuring a reference signal, and the reporting configuration notifies the terminal device of a type of measurement performed based on the reference signal. The measurement object is associated with the reporting configuration by using the measurement identifier, so that the terminal device can obtain a complete description of a measurement. One measurement object MO may be associated with one or more reporting configurations RCs, or one reporting configuration RC may be associated with one or more measurement objects MOs. For example, as shown in FIG. 1, a measurement object MO 1 may be associated with a reporting configuration RC 1 by using a measurement identifier MI 1, and a reporting configuration RC 2 is associated with a measurement object MO 2 by using a measurement identifier MI 3.

(9) At least one of a or b: may specifically include a, b, and a and b, where a and b each may be in single or plural form.

It may be understood that, in descriptions of this application, words such as "first" and "second" are merely used for distinction and description, and cannot be understood as an indication or implication of relative importance, or an indication or implication of an order.

In the embodiments of this application, the word "example" or "for example" is used to represent giving an example, an illustration, or a description. Any embodiment or design scheme described as an "example" or "for example" in the embodiments of this application shall not be explained as being more or having more advantages than another embodiment or design scheme. Exactly, use of the word such as "example" or "for example" is intended to present a relative concept in a specific manner.

Figure 2:
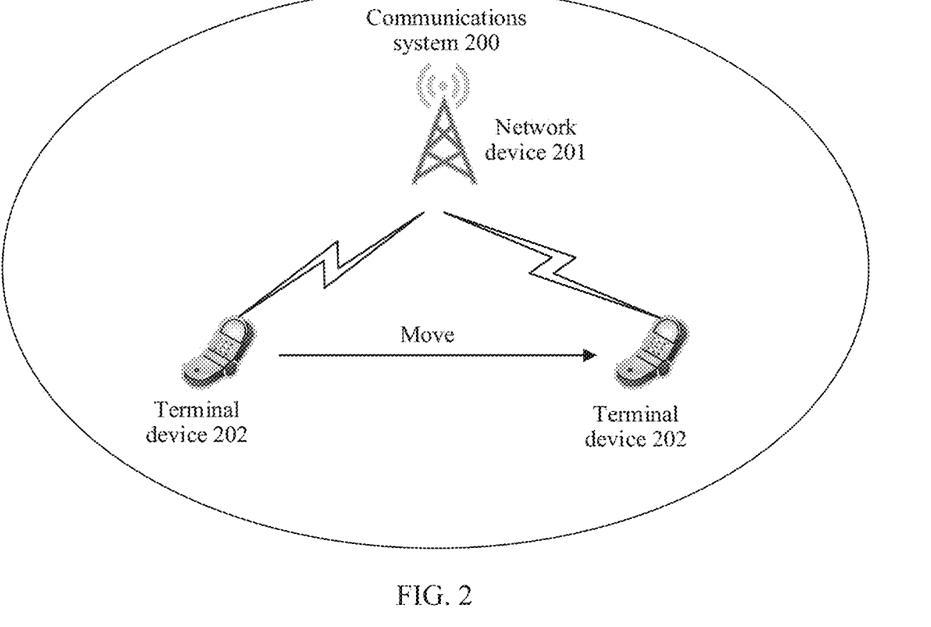
FIG. 2 is a schematic diagram of a communications system according to an embodiment of this application.

As shown in FIG. 2, an embodiment of this application provides a communications system 200. The communications system 200 may include a network device 201 and a terminal device 202.

In a new radio access technology (NR), because the terminal device 202 moves, the terminal device 202 needs to support mobility processes such as cell selection, cell reselection, and a cell handover. In this case, the terminal device 202 needs to monitor a cell.

Specifically, a downlink frequency band in which the terminal device 202 communicates with the network device 201 may include a plurality of component carriers (CC). Further, 3GPP defines two parts: a frequency range 1 below 6 GHz (frequency range 1, FR 1) and a frequency range 2 above 24 GHz (frequency range 2, FR 2) for a spectrum. A frequency range of the FR 1 ranges from 450 MHz to 6000 MHz, and a frequency range of the frequency range 2 ranges from 24250 MHz to 52600 MHz. The CC may be within the frequency range of the FR 1 or the frequency range of the frequency range 2.

For each CC, the terminal device 202 needs to monitor at least several cells and synchronization signal blocks (SSB). Specifically, when the CC is within the frequency range of the FR 1, 3GPP specifies that the terminal device 202 shall monitor at least eight cells and 14 SSBs with different physical cell identifiers (PCI) and/or SSB time indexes on the CC. When the CC is within the frequency range of the frequency range 2, 3GPP specifies that the terminal device 202 needs to monitor, on only one CC, at least six cells and 24 SSBs with different PCIs and/or SSB time indexes in each frequency band of the frequency range 2. On another CC in the frequency band belonging to the frequency range 2, only at least two SSBs with different SSB time indexes are monitored in the serving cell.

Based on this, a concept of a full-capability CC and a concept of a non-full-capability CC are defined for the CC within the frequency range of the frequency range 2. For the concept of the full-capability CC, refer to the foregoing concept description (4). For the concept of the non-full-capability CC, refer to the foregoing concept description (5).

It is specified in the 3GPP protocol that the terminal device 202 may determine, in either one of the following manners, a full-capability CC and a non-full-capability CC from the plurality of CCs included in the downlink frequency band.

Manner 1: If there is a primary component carrier (PCC) or a primary secondary component carrier (PSCC) in the CC in the downlink frequency band, it is determined that the PCC or the PSCC is a full-capability CC, and a remaining CC in the downlink frequency band is a non-full-capability CC.

Manner 2: If the downlink frequency band includes only one secondary component carrier (SCC), it is determined that the SCC is a full-capability CC.

If the downlink frequency band includes a plurality of SCCs, how to determine a full-capability CC and a non-full-capability CC from the plurality of SCCs is not specified in the 3GPP protocol.

Solution 1: The terminal device 202 determines the full-capability CC and the non-full-capability CC by itself.

Because the terminal device measures only the serving cell on the non-full-capability CC, and does not measure a neighboring cell; and cannot support the mobility process such as a handover on the non-full-capability CC. If the terminal device determines the full-capability CC and the non-full-capability CC by itself, the network device 201 cannot learn which CC is set by the terminal device 202 to the full-capability CC and which CC is set by the terminal device 202 to the non-full-capability CC. Further, the network device 201 cannot know a specific CC on which the terminal device 202 measures a neighboring cell, either, and consequently cannot instruct the terminal device to perform an operation such as cell handover, affecting network scheduling.

Solution 2: The terminal device 202 uses a first activated SCC as the full-capability CC. To be specific, when a downlink frequency band belongs to the frequency range 2 includes a plurality of SCCs, the terminal device 202 uses the first activated SCC as the full-capability CC.

First, in the NR, the network device may activate a plurality of SCCs at a time. If the network device activates a plurality of SCCs at a time, in other words, the plurality of SCCs are activated at a same time, there is no related solution to how to determine a full-capability CC from the plurality of SCCs.

Figure 3:
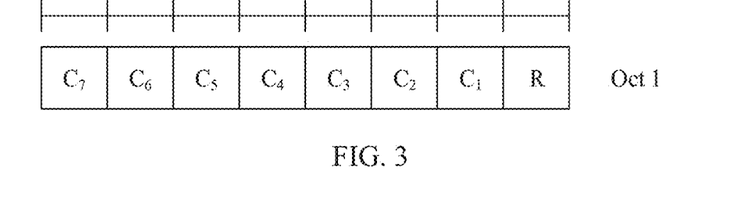
FIG. 3 is a schematic diagram of a bit mapping table according to an embodiment of this application.

For example, it is specified in 3GPP that an SCC may be activated in the following manner: The network device 201 sends a bit mapping table to the terminal device 202, where in the bit mapping table, a bit whose value is 1 corresponds to activation of an SCC, and a bit whose value is 0 corresponds to no activation of an SCC. For the bit mapping table, refer to FIG. 3. It can be learned from FIG. 3 that the bit mapping table may include seven bits and one reserved (R) bit. The seven bits are sequentially $C_1$ to $C_7$. Values of $C_1$ to $C_7$ may be 1 or 0, where a value 1 may represent activation of a corresponding SCC, and a value 0 may represent no activation of a corresponding SCC.

Further, even if the network device 201 activates only one SCC at a time, to determine an SCC activation sequence, the terminal device 202 needs to record an SCC activation time, increasing costs of the terminal device 202.

Solution 3: The network device 201 configures an MO only for a full-capability CC, but not for a non-full-capability CC. The terminal device 202 may determine, based on whether an MO is configured for an SCC, whether the SCC is the full-capability CC or the non-full-capability CC.

Because it is specified in 3GPP that a network shall ensure that, in a measurement configuration, a measurement object is configured for a SpCell and each SCell that needs to be measured, provided that UE is configured with the measurement configuration. It can be learned that, it is specified in 3GPP that an MO needs to be configured for each SCC. The foregoing solution in which the MO is configured only for the full-capability CC, but not for the non-full-capability CC is in conflict with that specified in 3GPP above.

Figure 4:
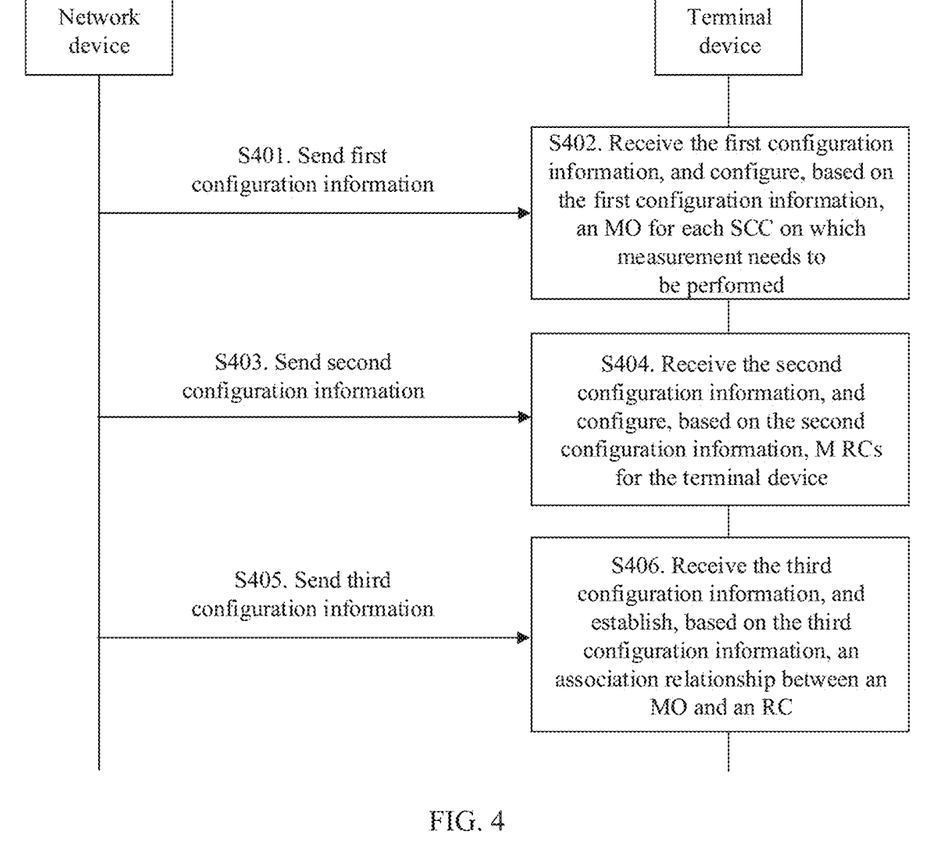
FIG. 4 is a flowchart of a communications method according to an embodiment of this application.

Based on the foregoing description, as shown in FIG. 4, a procedure of a communications method is provided. In the procedure, a terminal device may be the terminal device 202 in FIG. 2, and a network device may be the network device 201 in FIG. 2. It may be understood that a function of the terminal device may also be implemented by using a chip applied to the terminal device, and a function of the network device may also be implemented by using a chip applied to the network device. The procedure may include the following steps.

S401. The network device sends first configuration information to the terminal device.

In this embodiment of this application, it may be set that the terminal device needs to measure N SCCs in a downlink frequency band belonging to the frequency range 2, where N is a positive integer greater than or equal to 1, and the first configuration information is used to configure an MO for each of the N SCCs. Based on the first configuration information, a total of N MOs need to be configured for the terminal device.

S402. The terminal device receives the first configuration information, and configures, based on the first configuration information, an MO for each SCC on which measurement needs to be performed.

S403. The network device sends second configuration information to the terminal device, where the second configuration information is used to configure M RCs for the terminal device.

Optionally, the second configuration information may be further used to configure reporting types of the M RCs. For example, the network device may configure a reporting type of any one of the M RCs as an SSB, a CSI-RS, or the like.

S404. The terminal device receives the second configuration information, and configures, based on the second configuration information, the M RCs for the terminal device.

S405. The network device sends third configuration information to the terminal device, where the third configuration information is used to establish an association relationship between an MO and an RC.

S406. The terminal device receives the third configuration information, and establishes, based on the third configuration information, the association relationship between the MO and the RC.

For example, in this embodiment of this application, the association relationship between the MO and the RC may be established by using a measurement identifier list. As shown in FIG. 1, an association relationship between an MO 1 and an RC 1 may be established by using an MI 1, an association relationship between an MO 3 and an RC 4 may be established by using an MI 4, and the like.

In this embodiment of this application, any of the N MOs may be referred to as a first MO for convenience. The first MO may have an association relationship with one or more of the M RCs, or the first MO may have no association relationship with an RC. For example, as shown in FIG. 1, an MO 4 has no association relationship with the RC. Any one of the M RCs may be referred to as a first RC for convenience. The first RC may have an association relationship one or more of the N MOs, or the first RC may have no association relationship with an MO. For example, as shown in FIG. 1, an RC 3 has no association relationship with any MO.

In this embodiment of this application, in a frequency band of the frequency range 2, based on the third configuration information, only one MO may be configured to be associated with an RC whose reporting type is a first type, or at least two MOs may be configured to be associated with an RC whose reporting type is a first type.

Figure 5A:
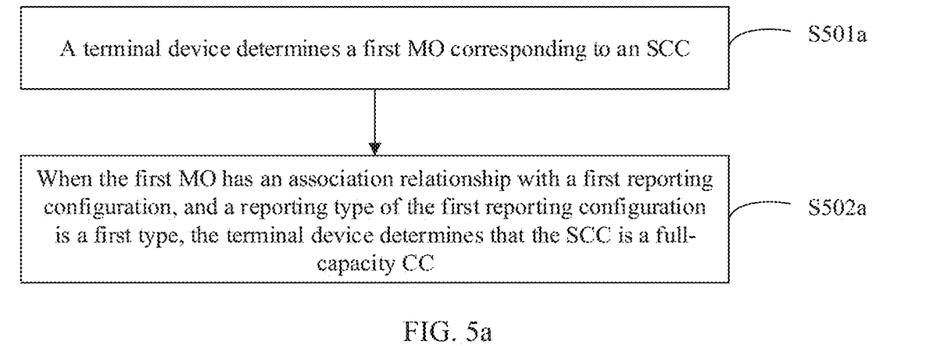
FIG. 5*a* is a flowchart of a communications method according to an embodiment of this application.

As shown in FIG. 5a, this application provides a procedure of a communications method. The procedure may be applicable to a scenario in which only one MO is associated with an RC whose reporting type is a first type. Specifically, a terminal device in the procedure may be the terminal device 202 in FIG. 2. The procedure may include the following steps:

S501a. The terminal device determines a first MO corresponding to an SCC.

S502a. When the first MO has an association relationship with a first reporting configuration, and a reporting type of the first reporting configuration is a first type, the terminal device determines that the SCC is a full-capability CC.

Figure 5B:
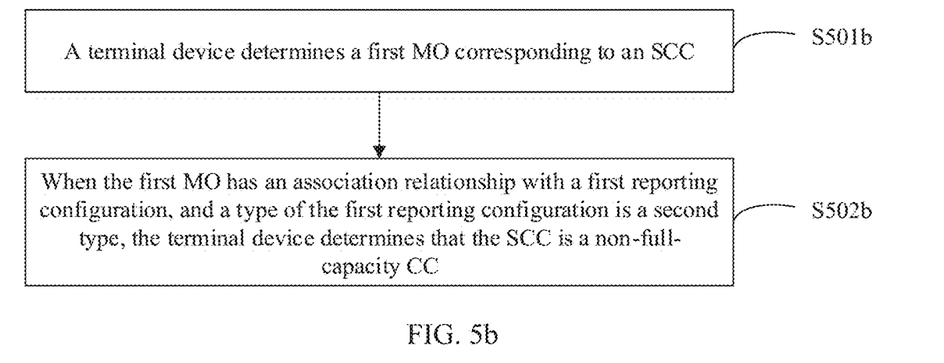
FIG. 5*b* is a flowchart of a communications method according to an embodiment of this application.

As shown in FIG. 5b, this application further provides a procedure of a communications method. The procedure may also be applicable to a scenario in which only one MO is associated with an RC whose reporting type is a first type. Specifically, a terminal device in the procedure may be the terminal device 202 in FIG. 2. The procedure may include the following steps:

S501b. The terminal device determines a first MO corresponding to an SCC.

S502b. When the first MO has an association relationship with the first reporting configuration, and a reporting type of the first reporting configuration is a second type, the terminal device determines that the SCC is a non-full-capability CC, where the first type is different from the second type. For example, the first type may be an SSB, and the second type may be a channel state information reference signal CSI-RS.

Figure 5C:
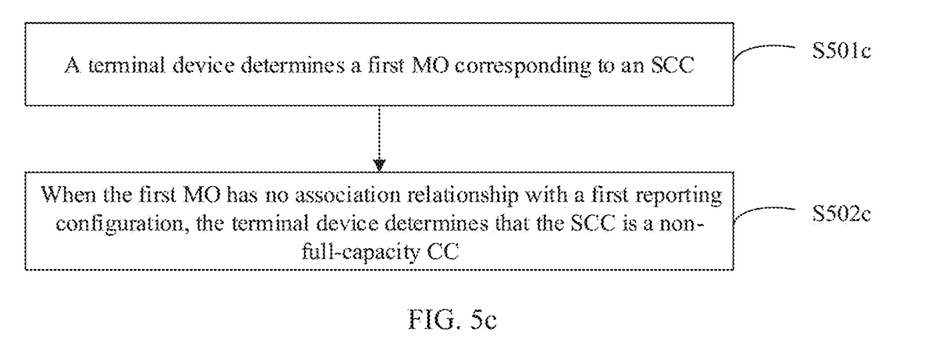
FIG. 5*c* is a flowchart of a communications method according to an embodiment of this application.

As shown in FIG. 5c, this application further provides a procedure of a communications method. The procedure may also be applicable to a scenario in which only one MO is associated with an RC whose reporting type is a first type. Specifically, a terminal device in the procedure may be the terminal device 202 in FIG. 2. The procedure may include the following steps:

S501c. The terminal device determines a first MO corresponding to an SCC.

S502c. When the first MO has no association relationship with the first reporting configuration, the terminal device determines that the SCC is a non-full-capability CC.

Figure 6:
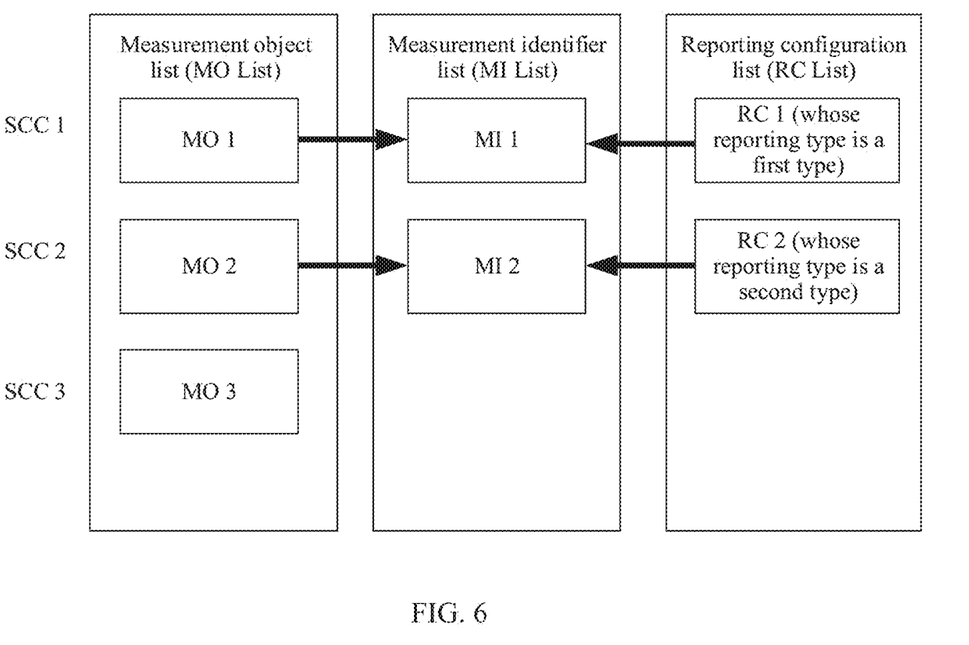
FIG. 6 is a schematic diagram of association between a measurement object and a reporting configuration according to an embodiment of this application.

As shown in FIG. 6, it is specified that a network device configures, for the terminal device in a frequency band of an frequency range 2, three SCCs on which measurement needs to be performed: an SCC 1, an SCC 2, and an SCC 3, and that there is no PCC or PSCC in the frequency band of the frequency range 2. If the network device expects the terminal device to use the SCC 1 as a full-capability CC, the network device associates, in a measurement configuration by using a measurement identifier MI 1, an MO 1 corresponding to the SCC 1 with a reporting configuration RC 1, where a reporting type of the reporting configuration 1 is a first type. An MO 2 corresponding to the SCC 2 is associated with a reporting configuration RC 2 by using a measurement identifier MI 2, a reporting type of the reporting configuration RC 2 is a second type, and an MO 3 corresponding to the SSC 3 is not associated with any reporting configuration. In this embodiment of this application, after receiving the measurement configuration, the terminal device may traverse an entire measurement identifier list (MI list). It may be found that, the MO 3 corresponding to the SCC 3 is not associated with any RC, and in this case, it may be determined that the SCC 3 is a non-full-capability CC; and the MO 2 corresponding to the SCC 2 is associated with the RC 2, the reporting type of the RC 2 is the second type, and in this case, it may be determined that the SCC 2 is a non-full-capability CC. Only the MO 1 corresponding to the SCC 1 is associated with the RC 1, and the reporting type of the RC 1 is the first type. In this case, it may be determined that the SCC 1 is a full-capability CC.

Figure 7:
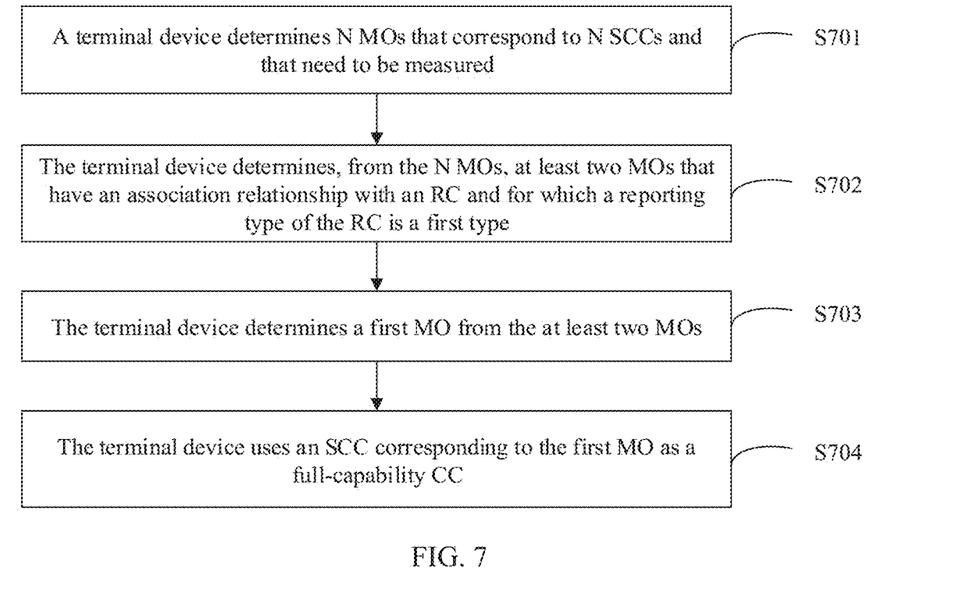
FIG. 7 is a flowchart of a communications method according to an embodiment of this application.

As shown in FIG. 7, this application provides a procedure of a communications method. The procedure may be applicable to a scenario in which at least two MOs are associated with an RC whose reporting type is a first type. Specifically, a terminal device in the procedure may be the terminal device 202 in FIG. 2. The procedure may include the following steps.

S701. The terminal device determines N MOs that correspond to N SCCs and that need to be measured, where the N MOs one-to-one correspond to the N SCCs, and N is a positive integer greater than 1.

S702. The terminal device determines, from the N MOs, at least two MOs that have an association relationship with an RC and for which a reporting type of the RC is a first type.

S703. The terminal device determines a first MO from the at least two MOs.

In this embodiment of this application, the terminal device may select, according to a specific rule, one MO from the at least two MOs as the first MO, or the terminal device may randomly select one MO from the at least two MOs as the first MO.

S704. The terminal device uses an SCC corresponding to the first MO as a full-capability CC.

In this embodiment of this application, if the network device may indicate a range of a full-capability CC to the terminal device, the terminal device may select by itself, within the range, an SCC as the full-capability CC.

It should be noted that the procedures shown in FIG. 4, FIG. 5a, FIG. 5b, FIG. 5c, and FIG. 7 may be used separately or may be used in combination. For example, a terminal device may establish an association relationship between an MO and an RC by using the procedure shown in FIG. 4. In addition, after the association relationship between the MO and the RC is established, the terminal device may determine a full-capability CC and a non-full-capability CC by using the procedure shown in FIG. 5a, FIG. 5b, FIG. 5c, or FIG. 7.

Figure 8:
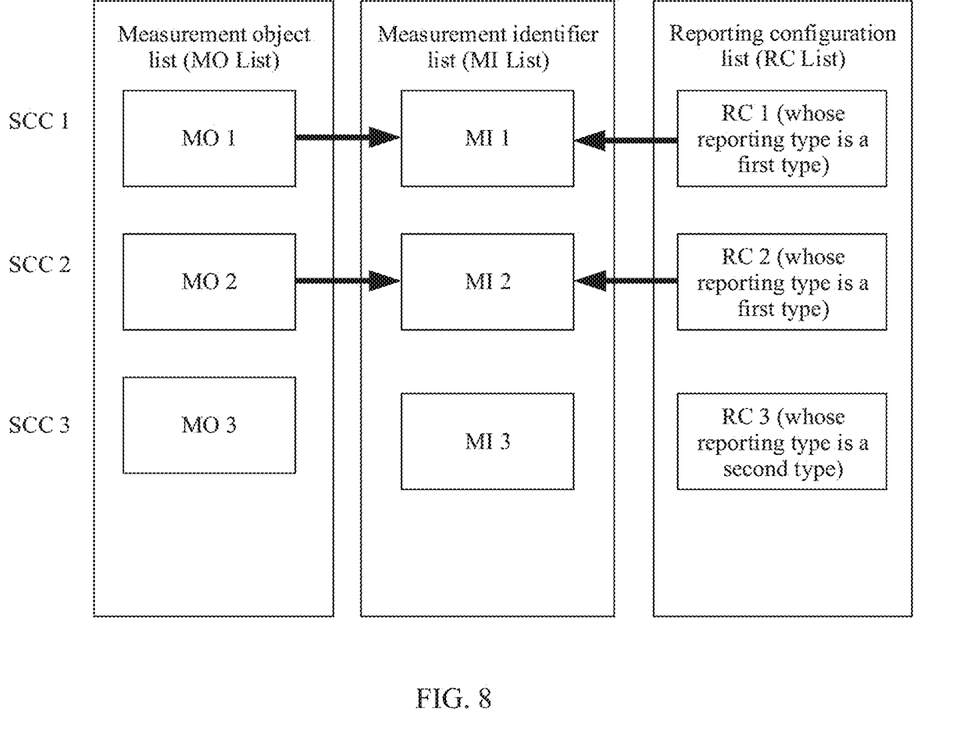
FIG. 8 is a schematic diagram of association between a measurement object and a reporting configuration according to an embodiment of this application.

As shown in FIG. 8, it is specified that a network device configures, for a terminal device in a frequency band belongs to an frequency range 2, three SCCs on which measurement needs to be performed: an SCC 1, an SCC 2, and an SCC 3, and there is no PCC or PSCC in the frequency band belongs to the frequency range 2, but the network device expects the terminal device to use the SCC 1 or the SCC 2 as a full-capability CC. In this case, the network device associates, in a measurement configuration by using a measurement identifier MI 1, an MO 1 corresponding to the SCC 1 with a reporting configuration RC 1, where a reporting type of the reporting configuration 1 is a first type. An MO 2 corresponding to the SCC 2 is associated with a reporting configuration RC 2 by using a measurement identifier MI 2, and a reporting type of the reporting configuration 2 is the first type. An MO 3 corresponding to the SS 3 is not associated with any reporting configuration, or an MO 3 corresponding to the SS 3 is associated with an RC 3 by using an MI 3, where a reporting type of the RC 3 is a second type. In an example shown in FIG. 8, an example in which no RC is configured for the MO 3 corresponding to the SCC 3 is used for description. After receiving the measurement configuration, the terminal device may traverse an entire measurement identifier list. It may be found that the MO 3 corresponding to the SCC 3 is not associated with any RC. It may be determined that the SCC 3 is a non-full-capability CC, the MO 1 corresponding to the SCC 1 and the MO 2 corresponding to the SCC 2 each are associated with the RC, and a reporting type of the associated RC is the first type. In this case, in this embodiment of this application, the terminal device may select, from the SCC 1 and the SCC 2, one SCC as a full-capacity CC. For example, the terminal device may use the SCC 1 as a full-capability CC, or use the SCC 2 as a full-capability CC. This is not limited in this application.

In this embodiment of this application, an indication method is provided for indicating a full-capability CC based on whether a measurement object and a reporting configuration are associated or not. The indication method resolves a problem in an existing protocol that a specific SCC cannot be determined as a full-capability CC when there is no PCC or PSCC in a frequency band and there are at least two SCCs. In addition, the indication method is compatible with the existing protocol and has few changes to the existing protocol.

It should be noted that, in the procedure shown in FIG. 4, FIG. 5*a*, FIG. 5*b*, FIG. 5*c*, or FIG. 7, the first type may be but is not limited to an SSB, and the second type may be but is not limited to a CSI-RS.

In this embodiment of this application, the procedure shown in FIG. 4, FIG. 5*a*, FIG. 5*b*, FIG. 5*c*, or FIG. 7 may be specifically based on the following principles.

A measurement procedure is specified in 3GPP as follows:

"Provided that a network configures a measurement configuration for UE, the UE shall measure, according to following procedures, RSRP and RSRQ of each serving cell configured with a measurement object."

Provided that at least one of measurement identifiers configured by the network for the UE uses an SINR as a reporting measurement quantity or trigger measurement quantity, the UE further needs to measure a SINR of each serving cell configured with a measurement object.

For each measurement identifier in the measurement configuration, the UE performs, according to the following processes, measurement for each cell (including a neighboring cell and a serving cell) on a carrier frequency corresponding to the measurement identifier.

It is specified in 3GPP that, measurement performed by the terminal device for the serving cell does not necessarily require association between an MO and an RC, and measurement performed on the neighboring cell requires association between the MO and the RC. For a full-capability CC, measurement needs to be performed for the serving cell and the neighboring cell. For a non-full-capability CC, measurement needs to be performed only for the serving cell. Therefore, it may be determined, based on an association relationship between the MO and a reporting configuration, that an SCC is a full-capability CC or a non-full-capability CC. In other words, when an MO corresponding to an SCC has an association relationship with a reporting configuration, it may be determined that the SCC is a full-capability CC; or when an MO corresponding to an SCC has no association relationship with a reporting configuration, it may be determined that the SCC is a non-full-capability CC. In actual application, there may be different types of cell measurements performed by the terminal device, for example, an SSB type and a channel state information reference signal CSI-RS type. However, a focus in this embodiment of this application is to improve SSB reporting. Therefore, in this embodiment of this application, for example, when an MO has an association relationship with an RC, and a reporting type of the RC is an SSB type, it is determined that an SCC corresponding to the MO is a full-capability CC.

Figure 9:
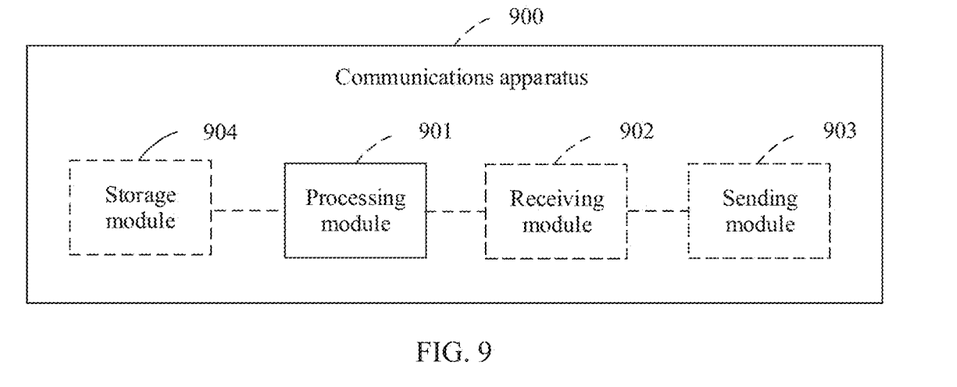
FIG. 9 is a schematic structural diagram of a communications apparatus according to an embodiment of this application.

Based on the foregoing concept, as shown in FIG. 9, an embodiment of this application provides a communications apparatus 900. The communications apparatus 900 may be configured to implement a function of the terminal device in the procedure shown in FIG. 4, FIG. 5*a*, FIG. 5*b*, FIG. 5*c*, or FIG. 7. The communications apparatus 900 may be applied to a terminal device or a chip in a terminal device. The communications apparatus 900 may include a processing module 901 and a storage module 904. Optionally, the communications apparatus 900 may further include a receiving module 902 and a sending module 903.

In an example, the storage module 904 may be configured to store a program instruction. The processing module 901 may be configured to read the instruction stored in the storage module 904, to perform the following processes: determining a first measurement object corresponding to a secondary component carrier; and when there is an association relationship between the first measurement object and a first reporting configuration, and a reporting type of the first reporting configuration is a first type, determining that the secondary component carrier is a full-capability component carrier; or when there is an association relationship between the first measurement object and a first reporting configuration, and a reporting type of the first reporting configuration is a second type, determining that the secondary component carrier is a non-full-capability component carrier, where the first type is different from the second type.

In an example, the storage module 904 may be configured to store a program instruction. The processing module 901 may be configured to read the instruction stored in the storage module 904, to perform the following processes: determining a first measurement object corresponding to a secondary component carrier; and when there is no association relationship between the first measurement object and a first reporting configuration, determining that the secondary component carrier is a non-full-capacity component carrier.

In an example, the storage module 904 may be configured to store a program instruction. The processing module 901 may be configured to read the instruction stored in the storage module 904, to perform the following processes: determining N measurement objects corresponding to N secondary component carriers on which measurement needs to be performed, where the N secondary component carriers one-to-one correspond to the N measurement objects, and N is a positive integer greater than 1; determining, from the N measurement objects in a frequency band belongs to a frequency range 2, at least two measurement objects that have an association relationship with a reporting configuration and for which a reporting type of the reporting configuration is a first type; determining a first measurement object from the at least two measurement objects; and using a secondary component carrier corresponding to the first measurement object as a full-capacity carrier unit.

Optionally, the receiving module 902 may be configured to receive first configuration information, second configuration information, and third configuration information that are sent by the network device. For the first configuration information, the second configuration information, and the third configuration information, refer to the description in the foregoing method embodiments.

In this embodiment of this application, for descriptions of the processing module 901 and the receiving module 902, refer to the descriptions of the procedures shown in FIG. 4, FIG. 5a, FIG. 5b, FIG. 5c, or FIG. 7. Details are not described herein again.

It should be specially noted that, in this communications apparatus, an entity apparatus corresponding to the processing module may be a processor, an entity device corresponding to the receiving module may be a receiver. Further, an entity apparatus corresponding to the sending module is a transmitter, and an entity device corresponding to the storage module is a memory.

Figure 10:
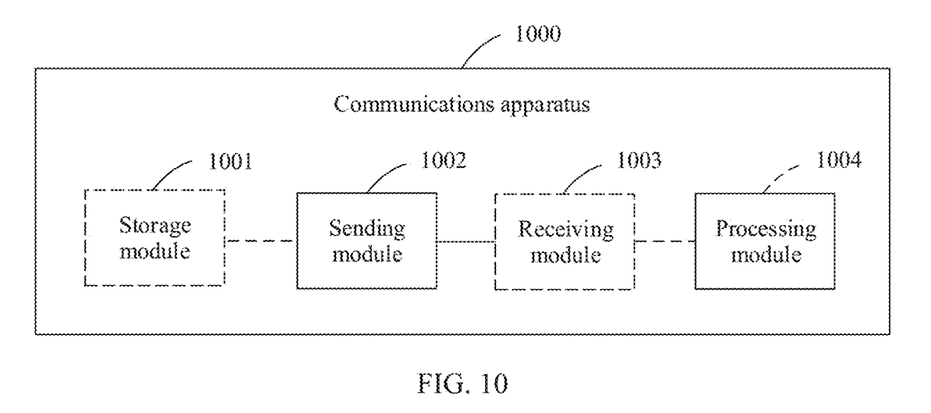
FIG. 10 is a schematic structural diagram of a communications apparatus according to an embodiment of this application.

Based on the foregoing concept, as shown in FIG. 10, an embodiment of this application provides a communications apparatus 1000. The communications apparatus 1000 may be configured to implement a function of the network device in the procedure shown in FIG. 4. The communications apparatus 1000 may be applied to a network device or a chip in a network device. The communications apparatus 1000 may include a sending module 1002 and a processing module 1004. Optionally, the communications apparatus 1000 may further include a storage module 1001 and a receiving module 1003.

In an example of this application, the processing module 1004 is configured to generate first configuration information, second configuration information, and third configuration information. The sending module 1002 may send the first configuration information, the second configuration information, and the third configuration information that are determined by the processing module 1004.

In this embodiment of this application, for specific descriptions of the sending module 1002 and the processing module 1004, refer to records in the foregoing method embodiments.

In this embodiment of this application, in the communications apparatus 1000, an entity apparatus corresponding to the processing module may be a processor, an entity device corresponding to the receiving module may be a receiver, an entity apparatus corresponding to the sending module is a transmitter, and an entity device corresponding to the storage module is a memory.

Figure 11:
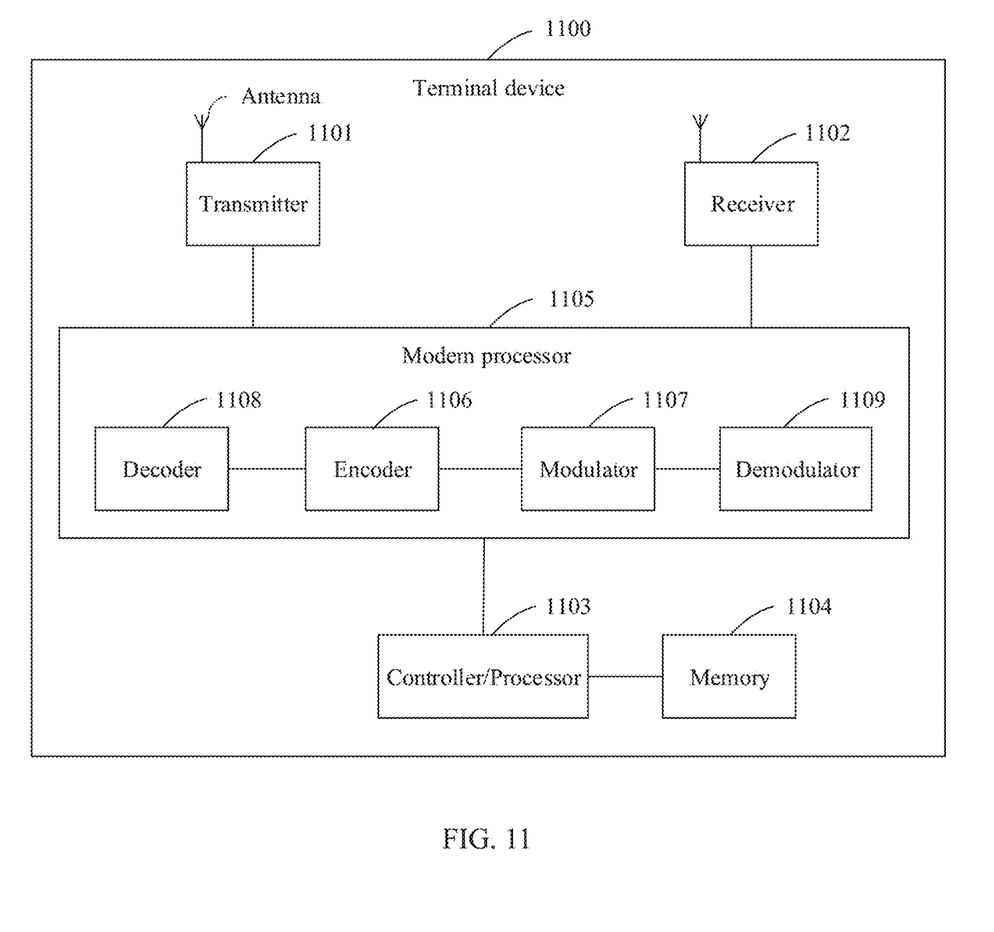
FIG. 11 is a schematic structural diagram of a terminal device according to an embodiment of this application.

FIG. 11 is a simplified schematic diagram of a possible design structure of the terminal device in the foregoing embodiments. The terminal device 1100 includes a transmitter 1101, a receiver 1102, a controller/processor 1103, a memory 1104, and a modem processor 1105.

The transmitter 1101 adjusts (for example, performs analog conversion, filtering, amplification, and up-conversion on) an output sample and generates an uplink signal. The uplink signal is transmitted to the network device in the foregoing embodiments by using an antenna. In a downlink, an antenna receives a downlink signal transmitted by the network device in the foregoing embodiments. The receiver 1102 adjusts (for example, performs filtering, amplification, down-conversion, and digitalization on) the signal received from the antenna and provides an input sample. In the modem processor 1105, an encoder 1106 receives service data and a signaling message that are to be sent on an uplink, and processes (for example, formats, encodes, and interleaves) the service data and the signaling message. A modulator 1107 further processes (for example, performs symbol mapping and modulation) encoded service data and an encoded signaling message, and provides an output sample. The demodulator 1109 processes (for example, demodulates) the input sample and provides a symbol estimate. A decoder 1108 processes (for example, de-interleaves and decodes) the symbol estimate and provides the decoded data and signaling message that are to be sent to UE. The encoder 1106, the modulator 1107, the demodulator 1109, and the decoder 1108 may be implemented by an integrated modem processor 1105. These units perform processing based on a radio access technology (for example, an access technology of an NR system or another evolution system) used by a radio access network.

The controller/processor 1103 controls and manages an action of the terminal device and is configured to perform processes performed by the terminal device in the foregoing embodiments. For example, the processes may be: determining a first measurement object corresponding to a secondary component carrier; and when there is an association relationship between the first measurement object and a first reporting configuration, and a reporting type of the first reporting configuration is a first type, determining that the secondary component carrier is a full-capability component carrier; or when there is an association relationship between the first measurement object and a first reporting configuration, and a reporting type of the first reporting configuration is a second type, determining that the secondary component carrier is a non-full-capability component carrier. For example, the controller/processor 1103 is configured to support the terminal device in performing the steps shown in FIG. 4, FIG. 5a, FIG. 5b, FIG. 5c, or FIG. 7. The memory 1104 is configured to store program code and data that are related to the terminal device 1100.

It should be noted that the terminal device 1100 provided in this embodiment of this application is configured to implement the communications method shown in FIG. 4, FIG. 5a, FIG. 5b, FIG. 5c, or FIG. 7, or a function of the terminal device in the communications method shown in FIG. 4, FIG. 5a, FIG. 5b, FIG. 5c, or FIG. 7. Only a connection relationship between modules of the terminal device 1100 is described herein. For a specific solution of processing the communications method by the terminal device 1100 and a specific action performed by the terminal device 1100, refer to related descriptions in the foregoing method embodiments. Details are not described herein again.

Figure 12:
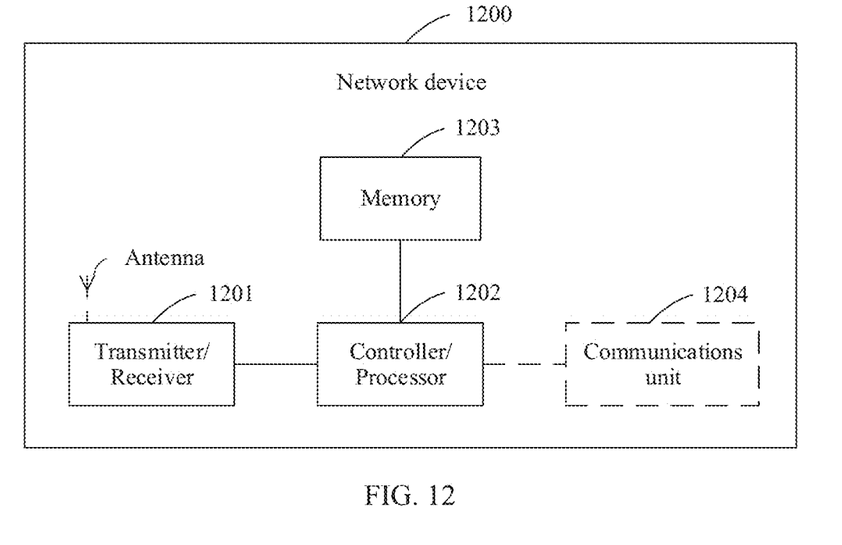
FIG. 12 is a schematic structural diagram of a network device according to an embodiment of this application.

FIG. 12 is a schematic diagram of a possible structure of the network device in the foregoing embodiments. The network device 1200 includes a transmitter/receiver 1201, a controller/processor 1202, and a memory 1203.

The transmitter/receiver 1201 is configured to support information receiving and sending between the network device and the terminal device in the foregoing embodiments, and support radio communication between the network device and another terminal device. The controller/processor 1202 performs various functions for communicating with the terminal device. In an uplink, an uplink signal from the terminal device is received by using an antenna, is demodulated by the receiver 1201, and is further processed by the controller/processor 1202 to restore service data and signaling information that are sent by the terminal device. In a downlink, service data and a signaling message are processed by the controller/processor 1202 and are demodulated by the transmitter 1201 to generate a downlink signal, and the downlink signal is transmitted to the terminal device by using an antenna. The controller/ processor 1202 further performs a processing process that relates to the network device in FIG. 4 and/or another process of the technologies described in this application.

The memory 1203 is configured to store program code and data of the network device. The network device 1200 may further include a communications unit 1204, and the communications unit 1204 is configured to support the network device in communicating with another network entity.

It should be noted that the network device 1200 provided in this embodiment of this application is configured to implement a function of the network device in the communications method shown in FIG. 4. Only a connection relationship between modules of the network device 1200 is described herein. For a specific solution of processing the communications method by the network device 1200 and a specific action to be performed by the network device 1200, refer to related descriptions in the foregoing method embodiments. Details are not described herein again.

According to the method in the embodiments of this application, an embodiment of this application further provides a communications system, including the network device and the terminal device described above.

Based on the foregoing embodiments, an embodiment of this application further provides a computer storage medium. The storage medium stores a software program, and when read and executed by one or more processors, the software program may implement the method provided in any one or more of the foregoing embodiments. The computer storage medium may include any medium that can store program code, such as a USB flash drive, a removable hard disk, a read-only memory, a random access memory, a magnetic disk, or an optical disc.

Based on the foregoing embodiments, an embodiment of this application further provides a chip. The chip includes a processor, configured to implement a function in any one or more of the foregoing embodiments, for example, obtaining or processing information or a message in the foregoing methods. Optionally, the chip further includes a memory. The memory is configured to store a program instruction and data that are executed by the processor. The chip may also include a chip and another discrete device.

It should be understood that, the processor in the embodiments of this application may be a central processing unit (CPU), or may be another general purpose processor, a digital signal processor (DSP), an application-specific integrated circuit (ASIC), a field programmable gate array (FPGA) or another programmable logical device, a transistor logical device, a discrete hardware component, or the like. The general purpose processor may be a microprocessor or any conventional processor or the like.

The memory may include a read-only memory and a random access memory, and provide an instruction and data to the processor. A part of the memory may further include a non-volatile random access memory.

A bus system may further include not only a data bus but also a power bus, a control bus, a status signal bus, and the like. However, for clear description, various types of buses in the figure are marked as the bus system. In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of a hardware module and a software module in the processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

What is claimed is:

1. A method, comprising:
    determining N secondary component carriers (SCCs) on which a terminal device is configured to report synchronization signal block (SSB) based measurements, wherein the N SCCs are in a frequency range 2 band, and wherein N is a positive integer greater than or equal to 1; and
    determining a single carrier of the N SCCs in the frequency range 2 band when neither a primary component carrier (PCC) nor a primary secondary component carrier (PSCC) is in the frequency range 2 band, wherein the terminal device is capable of measuring at least six cells and at least 24 SSBs on the single carrier, and the terminal device is capable of measuring at least two SSBs on a serving cell for each of carriers which are other than the single carrier and which are in the frequency range 2 band, and wherein the 24 SSBs have different physical cell identifiers and/or time indexes.

2. The method according to claim 1, further comprising:
    determining measurement objects corresponding to the N SCCs, wherein the measurement objects are associated with a first reporting configuration, and a reporting type of the first reporting configuration is an SSB type.

3. The method according to claim 1, wherein when N is greater than 1, the single carrier is one SCC selected from the N SCCs based on a rule.

4. The method according to claim 1, wherein the N SCCs are from M SCCs in the frequency range 2 band, wherein on at least one of the M SCCs, the terminal device is configured to report channel state information reference signal (CSI-RS) based measurements, and wherein M is an integer larger than N.

5. The method according to claim 1, wherein the method is performed by the terminal device or a chip for the terminal device.

6. The method according to claim 1, wherein the method is performed by a network device or a chip for the network device.

7. The method according to claim 6, further comprising:
    sending first configuration information to the terminal device, wherein the first configuration information is used to configure measurement objects corresponding to the N SCCs;
    sending second configuration information to the terminal device, wherein the second configuration information is used to configure L reporting configurations, and L is a positive integer greater than or equal to 1; and
    sending third configuration information to the terminal device, wherein the third configuration information is used to establish an association relationship between the measurement objects and a first reporting configuration, the first reporting configuration is one of the L reporting configurations, and a reporting type of the first reporting configuration is an SSB type.

8. An apparatus, comprising:
    at least one processor, configured to execute an instruction, wherein the instruction, when executed by the at least one processor, causes the apparatus to:

determine N secondary component carriers (SCCs) on which a terminal device is configured to report synchronization signal block (SSB) based measurements, wherein the N SCCs are in a frequency range 2 band, wherein N is a positive integer greater than or equal to 1; and determine a single carrier of the N SCCs in the frequency range 2 band when neither a primary component carrier (PCC) nor a primary secondary component carrier (PSCC) in the frequency range 2 band, wherein the terminal device is capable of measuring at least six cells and at least 24 SSBs on the single carrier, and the terminal device is capable of measuring at least two SSBs on a serving cell for each of carriers which are other than the single carrier and which are in the frequency range 2 band, and wherein the 24 SSBs have different physical cell identifiers and/or time indexes.

9. The apparatus according to claim 8, wherein the instruction, when executed by the at least one processor, causes the apparatus further to:

determine measurement objects corresponding to the N SCCs, wherein the measurement objects are associated with a first reporting configuration, and a reporting type of the first reporting configuration is an SSB type.

10. The apparatus according to claim 8, wherein when N is greater than 1, the single carrier is one SCC selected from the N SCCs based on a rule.

11. The apparatus according to claim 8, wherein the N SCCs are from M SCCs in the frequency range 2 band, wherein on at least one of the M SCCs, the terminal device is configured to report channel state information reference signal (CSI-RS) based measurements, and wherein M is an integer larger than N.

12. The apparatus according to claim 8, wherein the instruction, when executed by the at least one processor, causes the apparatus further to:

send first configuration information to the terminal device, wherein the first configuration information is used to configure measurement objects corresponding to the N SCCs;

send second configuration information to the terminal device, wherein the second configuration information is used to configure L reporting configurations, and L is a positive integer greater than or equal to 1; and send third configuration information to the terminal device, wherein the third configuration information is used to establish an association relationship between the measurement objects and a first reporting configuration, the first reporting configuration is one of the L reporting configurations, reporting type of the first reporting configuration is an SSB type.

13. The apparatus according to claim 8, wherein the apparatus is the terminal device or a chip for the terminal device.

14. The apparatus according to claim 8, wherein the apparatus is a network device or a chip for the network device.

* * * * *